United States Patent
Kramer et al.

(10) Patent No.: US 10,283,814 B2
(45) Date of Patent: May 7, 2019

(54) ELECTROLYTE FOR LITHIUM-BASED ENERGY STORES

(75) Inventors: Elisabeth Kramer, Mannheim (DE);
Rene Schmitz, Mannheim (DE);
Stefano Passerini, Munster (DE);
Martin Winter, Munster (DE)

(73) Assignee: WESTFALISCHE WILHELMS UNIVERSITAT MUNSTER, Munster (DE)

( * ) Notice: Subject to any disclaimer, the term of this patent is extended or adjusted under 35 U.S.C. 154(b) by 661 days.

(21) Appl. No.: 14/236,110

(22) PCT Filed: Aug. 2, 2012

(86) PCT No.: PCT/EP2012/065142
§ 371 (c)(1),
(2), (4) Date: Jan. 30, 2014

(87) PCT Pub. No.: WO2013/017658
PCT Pub. Date: Feb. 7, 2013

(65) Prior Publication Data
US 2014/0154590 A1 Jun. 5, 2014

(30) Foreign Application Priority Data
Aug. 3, 2011 (DE) .................. 10 2011 052 383

(51) Int. Cl.
| | | |
|---|---|---|
| H01M 10/00 | (2006.01) | |
| H01M 10/0567 | (2010.01) | |
| H01M 10/052 | (2010.01) | |
| H01M 10/0525 | (2010.01) | |
| H01M 14/00 | (2006.01) | |
| H01G 11/58 | (2013.01) | |

(52) U.S. Cl.
CPC ........ H01M 10/0567 (2013.01); H01G 11/58 (2013.01); H01M 10/052 (2013.01); H01M 10/0525 (2013.01); H01M 14/00 (2013.01)

(58) Field of Classification Search
CPC .............. H01M 10/05; H01M 10/052; H01M 10/0567; H01M 10/0525; H01M 14/00; H01M 10/26; H01G 11/58
USPC ....................................................... 429/338
See application file for complete search history.

(56) References Cited

U.S. PATENT DOCUMENTS 4,003,807 A * 1/1977 Childs .................. C25B 3/08
205/349
2006/0068283 A1 3/2006 Segawa et al.

FOREIGN PATENT DOCUMENTS

| DE | 102005048802 A1 | 4/2007 |
| EP | 0948073 A1 | 10/1999 |
| EP | 2037468 A1 | 3/2009 |

(Continued)

OTHER PUBLICATIONS

Machine Traslation of JP 2009-099449 A, Atsumichi et al., extracted on the Nov. 28, 2016.*

(Continued)

*Primary Examiner* — Nicholas P D'Aniello
*Assistant Examiner* — Abibatu O Ojo-Amoo
(74) *Attorney, Agent, or Firm* — Reising Ethington, P.C.

(57) ABSTRACT

The invention relates to an electrolyte, comprising at least one lithium salt, a solvent, and at least one compound according to general formula (1). The invention further relates to lithium-based energy stores comprising such an electrolyte.

18 Claims, 5 Drawing Sheets

(56) References Cited

FOREIGN PATENT DOCUMENTS

| JP | 10334946 A | * | 12/1998 |
| JP | 2009099449 A | * | 5/2009 |
| WO | 2005096411 A2 | | 10/2005 |

OTHER PUBLICATIONS

Machine Translation: Tamura Masayuki et al. (JPH10334946 A), extracted on Sep. 21, 2017 (Year: 1998).*
Machine Translation: Tamura Masayuki et al. (JPH10334946 A) (Abstract), extracted on Sep. 21, 2017 (Year: 1998).*
PCT International Preliminary Report on Patentability for International application No. PCT/EP2012/065142, dated Feb. 4, 2014, 8 pages.
English Abstract of JP 2009099449, filed May 7, 2009, 1 page.
Kazuhiko Maeda et al., "Microstructural Studies of Vinylidene Fluoride-Hexafluoroacetone Copolymer," Polymer Journal vol. 22, No. 8, pp. 681-687 (1990).

* cited by examiner

ELECTROLYTE FOR LITHIUM-BASED ENERGY STORES

TECHNICAL FIELD

The invention relates to an electrolyte that is particularly well-suited for lithium-based energy stores and comprises at least one lithium salt and one solvent.

BACKGROUND

Because of their energy and performance density, lithium ion batteries are popular energy stores particularly for uses in portable electronic devices. Lithium ion batteries comprise two electrodes which are spatially separated from one another by a separator whereby the lithium ions are reversibly intercalated or deintercalated into the electrodes. In particular, rechargeable lithium ion batteries (secondary batteries) or lithium ion storage batteries distinguish themselves by a high energy density, are thermally stable and are not subjected to a memory effect. Conventional lithium ion storage batteries use an anode made of carbon, usually graphite. The positive electrode usually has stable lithium transition compounds, for example lithium iron phosphate (LFP), lithium cobalt dioxide, lithium nickel dioxide, lithium nickel cobalt manganese oxide or lithium nickel cobalt aluminum oxide. The charge transport takes place via an electrolyte, the electrolyte containing a lithium salt dissolved in a solvent. The prior art discloses different electrolytes and conductive salts. Frequently used conductive lithium salts are, for example, lithium hexafluorophosphate (LiPF6), lithium perchlorate (LiClO4) or lithium borate salts.

Good electrolytes distinguish themselves by a good heat stability and good SEI (Solid Electrolyte Interphase)-forming properties. The so-called Solid Electrolyte Interphase is formed during the first charging process as an interphase at the interface between the electrolyte and the electrode. On graphite anodes in this case, a reductive decomposition of the electrolyte takes place, and the reaction products of the electrolyte reduction can form an adhering and electronically insulating but lithium ion conducting film on the anode. The Solid Electrolyte Interphase then prevents the electrode materials from reacting chemically with the electrolytes and protects the electrolytes from further reductive decomposition and the anode from destruction by the solvent. Especially when graphite anodes are used, the formation of a dense and adhering film is needed for a reliable operation of a lithium ion battery.

Some electrolytes, however, frequently show disadvantages in terms of the formation of the Solid Electrolyte Interphase. Propylene carbonate, for example, forms no Solid Electrolyte Interphase. Without the formation of a Solid Electrolyte Interphase, however, a graphite anode is destroyed by cointercalation of the propylene carbonate.

SUMMARY

One object of the present disclosure is therefore to provide an electrolyte which overcomes at least one of the aforesaid disadvantages of the prior art. In particular, one object of the present disclosure is to provide an electrolyte that favors the formation of a Solid Electrolyte Interphase.

This object is achieved by an electrolyte containing at least one lithium salt, a solvent and at least one compound of general formula (1) shown hereinbelow.

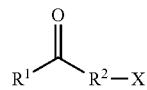

wherein

X is selected from the group containing F, Cl, Br and/or I;

$R^1$ is hydrogen or a C1-6 aliphatic, unsubstituted or simply or multiply substituted with at least one substituent selected from the group containing F, Cl, Br, I, $C_{1-4}$-alkyl, carbonyl oxygen and/or $C_{1-4}$-alkoxy;

$R^2$ is a $C_{1-6}$-aliphatic optionally simply or multiply substituted with at least one substituent selected from the group containing F, Cl, Br, I, $C_{1-4}$-alkyl, carbonyl oxygen and/or $C_{1-4}$-alkoxy;

where $R^1$ and $R^2X$ are not simultaneously $CF_3$; or $R^1$ and $R^2$ form simultaneously a saturated 5-member or 6-member ring which can be simply or multiply substituted with at least one substituent selected from the group containing F, Cl, Br, I, $C_{1-4}$-alkyl, carbonyl oxygen and/or $C_{1-4}$-alkoxy.

Other advantageous embodiments of the disclosure are indicated in the subclaims.

Surprisingly, it has been found that a compound of general formula (1) makes it possible to form a Solid Electrolyte Interphase very efficiently. By the use of a compound of general formula (1) in electrolytes, it is, in particular, possible to use as the main solvent for lithium-based energy stores solvents which by themselves do not form a Solid Electrolyte Interphase such as propylene carbonate.

Particularly advantageous may be that the compounds according to general formula (1) can contribute to the formation of a very stable Solid Electrolyte Interphase which over the entire duration of cyclization can protect graphite anodes from an exfoliation, an irreversible decomposition of the graphite structure. An additional advantage may be that the decomposition of the compounds of general formula (1) takes place clearly before the intercalation of lithium so that the formation of a stable Solid Electrolyte Interphase can take place before lithium is intercalated. This, in particular, allows the manufacture of long-life rechargeable batteries.

In one advantageous manner, compared to known electrolytes, an electrolyte of the disclosure can moreover lead to a low irreversible loss of capacity in the formation of a battery and to a high cyclization efficiency.

Without being based on any particular theory, it is assumed that the halogenation and particularly the fluorination in the alpha-position relative to the carbonyl group may be essential for the advantageous properties of the compounds.

By the term "$C_{1-6}$-aliphatic" in the sense of the present disclosure are to be understood aliphatic, acyclic, saturated or unsaturated, branched or unbranched carbon groups with 1 to 6 carbon atoms. These can be unsubstituted or singly or multiply substituted.

The compounds of general formula (1) preferably contain saturated $R^1$ and $R^2$ groups in this case. The $R^1$ and $R^2X$ groups are thus not simultaneously $CF_3$ so that perfluoroacetone, or 1,1,1,3,3,3-hexafluoro-2-propanone according to the IUPAC nomenclature, is excluded, as it is not suitable for the formation of a Solid Electrolyte Interphase. Moreover, perfluoroacetone is a gas and thus cannot be added as a solvent. The compounds of the disclosure are preferably not perhalogenated or perfluorinated.

The $R^1$ and $R^2$ groups are preferably linear or branched $C_1$-$C_5$-alkyl, $C_2$-$C_5$-alkenyl or $C_2$-$C_5$-alkinyl groups.

In preferred embodiments, $R^1$ is a linear or branched $C_1$-$C_5$-alkyl, $C_2$-$C_5$-alkenyl or $C_2$-$C_5$-alkinyl, either unsubstituted or substituted with one or more equal or different substituents selected from among the group containing F, Cl, Br, I, $C_{1-4}$-alkyl, carbonyl oxygen and/or $C_{1-4}$-alkoxy.

In further preferred embodiments, $R^2$ is a —$CR^3R^4$— group wherein
- $R^3$ is selected from a group containing hydrogen and/or a linear or branched $C_1$-$C_4$-alkyl, $C_2$-$C_4$-alkenyl or $C_2$-$C_4$-alkinyl which can be unsubstituted or substituted with one or more equal or different substituents selected from a group comprising F, Cl, Br, I, $C_{1-4}$-alkyl, carbonyl oxygen and/or $C_{1-4}$-alkoxy, and
- $R^4$ is selected from the group containing H, F, Cl, Br, I and/or linear or branched $C_1$-$C_4$-alkyl, $C_2$-$C_4$-alkenyl or $C_2$-$C_4$-alkinyl which are unsubstituted or can be substituted with one or more equal or different substituents selected from the group containing F, Cl, Br, I, $C_{1-4}$-alkyl, carbonyl oxygen and/or $C_{1-4}$-alkoxy.

Preferably, $R^1$ and $R^2$ are concurrently linear or branched $C_1$-$C_5$- or $C_1$-$C_4$-alkyl, -alkenyl or -alkinyl groups.

In preferred embodiments, at least one compound has the following general formula (2):

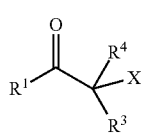

(2)

wherein
- X is selected from the group containing F, Cl, Br and/or I;
- $R^1$ is selected from the group containing hydrogen and/or linear or branched $C_1$-$C_5$-alkyl, $C_2$-$C_5$-alkenyl or $C_2$-$C_5$-alkinyl which are unsubstituted or substituted with one or more equal or different substituents selected from the group containing F, Cl, Br, I, $C_{1-4}$-alkyl, carbonyl oxygen and/or $C_{1-4}$-alkoxy;
- $R^3$ is selected from the group containing hydrogen and/or linear or branched $C_1$-$C_4$-alkyl, $C_2$-$C_4$-alkenyl or $C_2$-$C_4$-alkinyl which are unsubstituted or are substituted with one or more equal or different substituents selected from the group containing F, Cl, Br, I, $C_{1-4}$-alkyl, carbonyl oxygen and/or $C_{1-4}$-alkoxy;
- $R^4$ is selected from the group containing H, F, Cl, Br, I and/or linear or branched $C_1$-$C_4$-alkyl, $C_2$-$C_4$-alkenyl or $C_2$-$C_4$-alkinyl which are unsubstituted or are substituted with one or more equal or different substituents selected from the group containing F, Cl, Br, I, $C_{1-4}$-alkyl, carbonyl oxygen and/or $C_{1-4}$-alkoxy.

In one advantageous manner, in particular, a compound of general formula (2) can allow a very efficient formation of a Solid Electrolyte Interphase in electrolytes. It may be of special advantage that compounds of general formula (2) can contribute to the formation of a very stable Solid Electrolyte Interphase capable of protecting from an exfoliation over the entire cyclization time and from an irreversible destruction of the graphite structure. It is also advantageous that the decomposition of the compounds according to general formula (2) takes place clearly before the intercalation potential of lithium, whereby a stable Solid Electrolyte Interphase can be formed before lithium is intercalated. This, in particular, allows the manufacture of long-life rechargeable batteries.

The substituent X is a halogen selected from the group containing F, Cl, Br, and/or I. Said substituent is preferably a halogen selected from among F and/or Cl. In preferred embodiments, X is fluorine. In one advantageous manner, a fluorinated compound of general formula (2) in particular can be used to create an efficient Solid Electrolyte Interphase.

The term "$C_1$-$C_5$-alkyl" means, if not otherwise indicated, straight-chain or branched alkyl groups with 1 to 5 carbon atoms. The terms "$C_2$-$C_5$-alkenyl" and "$C_2$-$C_5$-alkinyl" mean, if not otherwise indicated, straight-chain or branched alkenyl- or alkinyl groups with 2 to 5 carbon atoms and at least one double bond or triple bond. Acyclic groups are preferred.

$C_1$-$C_4$-alkyl groups are preferred. If not otherwise indicated, preferred $C_1$-$C_4$-alkyl groups are straight-chain or branched alkyl groups with 1 to 4 carbon atoms preferably selected from the group containing methyl, ethyl, propyl, isopropyl, butyl, isobutyl, pentyl, isopentyl and/or neopentyl. Preferred $C_2$-$C_4$-alkenyl groups are selected from the group containing ethenyl and/or propenyl containing —$CH_2CH=CH_2$, —$CH=CH-CH_3$ and —$C(=CH_2)$—$CH_3$. Preferred $C_2$-$C_4$-alkinyl groups are selected from the group containing ethinyl and/or propinyl containing —$CH-C≡CH$ and —$C≡C-CH_3$.

The alkyl, alkenyl or alkinyl groups can be unsubstituted or simply or multiply substituted, for example doubly, triply or quadruply substituted. To this end, the alkyl, alkenyl or alkinyl groups can be multiply substituted on different as well as on the same carbon atoms.

The alkyl, alkenyl or alkinyl groups are preferably unsubstituted or are preferably substituted with one or more identical or different substituents selected from the group containing F, Cl, Br, I and/or $C_{1-4}$-alkyl. Alkyl, alkenyl and alkinyl groups can also be substituted with carbonyl oxygen and/or $C_{1-4}$-alkoxy, but substitution without oxygen is preferred.

Preferred are alkyl, alkenyl and alkinyl groups that are unsubstituted or are substituted with one or several equal or different substituents from the group containing F, Cl and/or $C_{1-2}$-alkyl. Alkyl, alkenyl and alkinyl group are preferably unsubstituted or are substituted with one or more F and/or Cl. When X is fluorine the $R^1$, $R^3$ and $R^4$ groups can also be substituted with chlorine. Preferably, however, the $R^1$, $R^3$ and $R^4$ groups are substituted with fluorine or with fluorine and chlorine.

$R^1$ is preferably hydrogen or a linear or branched unsubstituted or simply or multiply substituted group with F-substituted $C_1$-$C_3$-alkyl. Fluorinated compounds, in particular, can form a good Solid Electrolyte Interphase.

With particular preference, $R^1$ stands for unsubstituted or simply or multiply, particularly doubly, triply or quadruply, substituted $C_1$-$C_2$-alkyl. In preferred embodiments, $R^1$ is selected from the group containing $CH_3$, $CH_2F$, $CHF_2$, $CF_3$, $C_2H_5$, $C_2H_4F$, $C_2H_3F_2$, $C_2H_2F_3$, $C_2HF$ and/or $C_2F_5$ preferably selected from the group containing $CH_3$, $CH_2F$, $CHF_2$ and/or $CF_3$. In one advantageous manner, small alkyl groups lead to compounds of general formula (1) or (2) which can contribute to an efficient formation of a Solid Electrolyte Interphase.

$R^4$ is preferably selected from the group containing hydrogen, fluorine and/or linear or branched, unsubstituted or simply or multiply fluorine-substituted $C_1$-$C_4$-alkyl. $R^4$ preferably stands for hydrogen and/or fluorine. Also preferably, $R^4$ stands for unsubstituted or simply or multiply, particularly doubly, triply or quadruply, fluorine-substituted $C_1$-$C_2$-alkyl. Particularly preferably, $R^4$ is selected from the group containing $CH_3$, $CH_2F$, $CHF_2$ and/or $CF_3$.

$R^3$ is preferably selected from the group containing hydrogen and/or linear or branched, unsubstituted or simply or multiply fluorine-substituted $C_1$-$C_4$-alkyl. $R^3$ preferably stands for hydrogen. $R^3$ does not stand for fluorine of halogen. Further preferred, $R^3$ stands for unsubstituted or simply or multiply, especially doubly, triply or quadruply, fluorine-substituted $C_1$-$C_2$-alkyl. $R^3$ is particularly preferably selected from the group containing $CH_3$, $CH_2F$, $CHF_2$ and/or $CF_3$.

In preferred embodiments, in a compound of general formula (2), $R^1$ stands for hydrogen or a linear or branched unsubstituted or simply or multiply F-substituted $C_1$-$C_5$-alkyl, $R^3$ is selected from the group containing H and/or a linear or branched, unsubstituted or simply or multiply F-substituted $C_1$-$C_4$-alkyl, and $R^4$ is selected from the group containing H, F and/or a linear of branched unsubstituted or simply or multiply F-substituted $C_1$-$C_4$-alkyl.

In preferred embodiments, in a compound of the general formula (2), $R^1$ is selected from the group containing $CH_3$, $CH_2F$, $CHF_2$, $CF_3$, $C_2H_5$, $C_2H_4F$, $C_2H_3F_2$, $C_2H_2F_3$, $C_2HF_4$ and/or $C_2F_5$, preferably selected from the group containing $CH_3$, $CH_2F$, $CHF_2$ and/or $CF_3$, and $R^4$ is selected from the group containing hydrogen, fluorine and/or a linear or branched, unsubstituted or simply or multiply fluorine-substituted $C_1$-$C_2$-alkyl, preferably selected from the group containing $CH_3$, $CH_2$, F, $CHF_2$ and/or $CF_3$, and $R^3$ is selected from the group containing hydrogen and/or a linear or branched, unsubstituted or simply or multiply fluorine-substituted $C_1$-$C_2$-alkyl, preferably selected from the group containing $CH_3$, $CH_2$, F, $CHF_2$ and/or $CF_3$.

In preferred embodiments in a compound of general formula (1):

X is selected from the group containing F, Cl, Br and/or I;

$R^1$ is selected from the group containing H, $CH_3$, $CH_2F$, $CHF_2$, $CF_3$, $C_2H_5$, $C_2H_4F$, $C_2H_3F_2$, $C_2H_2F_3$ and/or $C_2HF_4$ and preferably from the group containing $CH_3$, $CH_2F$, $CHF_2$ and/or $CF_3$;

$R^2$ is a —$CR^3R^4$— group wherein:
  $R^3$ is selected from the group containing H, $CH_3$, $CH_2F$, $CHF_2$ and/or $CF_3$, and
  $R^4$ is selected from the group containing H, F, $CH_3$, $CH_2F$ and/or $CHF_2$, or $R^1$ and $R^2$ together form a saturated 5- or 6-membered ring with $R^4$ being hydrogen.

It is assumed that the halogenation and particularly the fluorination in the alpha-position relative to the carbonyl group may be essential for the advantageous properties of the compounds which can be cyclic or not cyclic.

In preferred embodiments, in a non-cyclic compound:

X is selected from the group containing F, Cl, Br and/or I;

$R^1$ is selected from the group containing H, $CH_3$, $CH_2F$, $CHF_2$, $CF_3$, $C_2H_5$, $C_2H_4F$, $C_2H_3F_2$, $C_2H_2F_3$ and/or $C_2HF_4$ and preferably from the group containing $CH_3$, $CH_2F$, $CHF_2$ and/or $CF_3$;

$R^2$ is a —$CR^3R^4$— group wherein:
  $R^3$ is selected from the group containing H, $CH_3$, $CH_2F$, $CHF_2$ and/or $CF_3$, and
  $R^4$ is selected from the group containing H, F, $CH_3$, $CH_2F$ and/or $CHF_2$.

In preferred embodiments, in a cyclic compound according to general formula (1), X is selected from the group containing F, Cl, Br and/or I and $R^1$ and $R^2$ together form a saturated 5- or 6-membered ring. According to general formula (2) wherein $R^2$ is formed by a —$CR^3R^4$— group, $R^1$ and $R^3$ together form the saturated 5- or 6-membered ring wherein $R^4$ is hydrogen. Preferably, the ring formed by $R^1$ and $R^2$ or by $R^1$ and $R^3$ has no substituents other than X.

Preferably, X is fluorine. Fluorinated compounds in particular can form a good Solid Electrolyte Interphase. $R^1$ is preferably selected from the group containing $CH_3$, $CH_2F$, $CHF_2$, $CF_3$, $C_2H_5$, $C_2H_4F$, $C_2H_3F_2$, $C_2H_2F_3$ and/or $C_2HF_4$, $R^1$ is preferably selected from the group containing $C_2H_5$, $C_2H_4F$, $C_2H_3F_2$, $C_2H_2F_3$ and/or $C_2HF_4$. Particularly preferably, $R^1$ is selected from the group containing $CH_3$, $CH_2F$, $CHF_2$ and/or $CF_3$, and preferably from the group containing $CH_3$, $CH_2F$ and/or $CHF_2$.

The compounds according to the disclosure are preferably not perhalogenated or perfluorinated compounds. Perhalogenated and particularly perfluorinated compounds usually have a lower boiling point and higher melting point than less fluorinated compounds so that the latter are better manageable. When $R^1$ and $R^3$ are $CF_3$, $R^4$ is then preferably not fluorine, or when $R^3$ is $CF_3$ and $R^4$ is fluorine, $R^1$ is then preferably not $CF_3$. Preferably, $R^3$ is chosen from the group containing H, $CH_3$, $CH_2F$ and/or $CHF_2$.

In preferred embodiments, in a compound according to general formula (1):

X is F;

$R^1$ is selected from the group containing H, $CH_3$, $CH_2F$, $CHF_2$, $CF_3$, $C_2H_5$, $C_2H_4F$, $C_2H_3F_2$, $C_2H_2F_3$ and/or $C_2HF_4$, preferably selected from the group containing $CH_3$, $CH_2F$, $CHF_2$ and/or $CF_3$;

$R^2$ is a —$CR^3R^4$— group wherein:
  $R^3$ is hydrogen, and
  $R^4$ is selected from the group containing H, F, $CH_3$, $CH_2F$ and/or $CHF_2$.

Fluorinated compounds in particular can form a good Solid Electrolyte Interphase.

R1 is preferably selected from the group containing $CH_3$, $CH_2F$, $CHF_2$, $CF_3$, $C_2H_5$, $C_2H_4F$, $C_2H_3F_2$, $C_2H_2F_3$ and/or $C_2HF_4$. $R^1$ is preferably selected from the group containing $C_2H_5$, $C_2H_4F$, $C_2H_3F_2$, $C_2H_2F_3$ and/or $C_2HF_4$. Particularly preferably, $R^1$ is selected from the group containing $CH_3$, $CH_2F$, $CHF_2$ and/or $CF_3$ and preferably from the one containing $CH_3$, $CH_2F$ and/or $CHF_2$.

In preferred embodiments, the compound according to general formula (1) is selected from the group containing $CF_3$—C(O)—$CHF_2$, $CF_3$—C(O)—$CH_2F$, $CHF_2$—C(O)—$CHF_2$, $CF_3$—C(O)—$CH_3$, $CH_2F$—C(O)—$CHF_2$, $CHF_2$—C(O)—$CH_3$, c and/or $CH_2F$—C(O)—$CH_3$. Particularly preferred is the compound according to general formula (1) or (2) selected from $CH_2F$—C(O)—$CH_2F$ and/or $CHF_2$. Especially preferred is the compound according to the general formula (1) $CF_3$—C(O)—$CH_2F$, i.e., fluoro-2-propanone or fluoroacetone.

In one advantageous manner, an electrolyte containing fluoroacetone can show a high cycle stability in the formation of an SEI. In particular, an early decomposition of the fluoro-acetone and the formation of SEI may be a definite advantage over the known SEI. Moreover, an electrolyte containing fluoroacetone can show very good properties also at high discharge rates.

Alternatively, $R^1$ and $R^2$ together can form a saturated 5- or 6-membered ring which can be substituted simply or multiply with at least one substituent selected from the group consisting of F, Cl, Br, I, $C_{1-4}$-alkyl, carbonyl oxygen and/or $C_{1-4}$-alkoxy. Preferably, a ring formed by $R^1$ and $R^2$ shows no substituents beyond X.

In preferred alternative embodiments, the compound according to general formula (1) is selected from the group of compounds that include those having the following formulas (3) or (4):

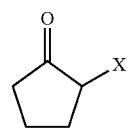
(3)

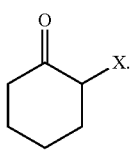
(4)

X can be selected from the group consisting of F, Cl, Br and/or I. Preferably, X is fluorine.

The compounds of general formula (1) are available commercially or can be prepared by standard methods known to experts in the art.

The electrolyte according to the disclosure contains a solvent besides at least one lithium salt and at least one compound of general formula (1). The solvent preferably serves as solvent for the lithium salt.

The electrolyte is preferably an essentially water-free organic, fluidizing or liquid electrolyte. The solvent is preferably an aprotic solvent. Suitable aprotic solvents are, for example, selected from the group consisting of cyclic carbonates, preferably ethylene carbonate (EC) and/or propylene carbonate (PC), linear carbonates, preferably diethyl carbonate (DEC), dimethyl carbonate (DMC) and/or ethyl methyl carbonate (EMC), nitriles, preferably acetonitrile (AN), dinitriles, preferably glutaronitrile (GLN), adiponitrile (AND) and/or pimelonitrile (PIN) and/or lactones, preferably gamma-butyrolactone (GBL) and/or gamma-valerolactone (GVL).

In a preferred embodiment, the solvent is an aprotic solvent selected from the group consisting of propylene carbonate, ethylene carbonate, diethyl carbonate, dimethyl carbonate, ethyl methyl carbonate, acetonitrile, glutaronitrile, adiponitrile, pimelonitrile, gamma-butyrolactone and/or gamma-valerolactone.

A particularly preferred aprotic solvent is propylene carbonate. According to the IUPAC nomenclature, propylene carbonate is also known as 4-methyl-1,3-dioxol-2-one. Propylene carbonate is commercially available and can be obtained, for example, as a by-product of the synthesis of polypropylene carbonate from propylene oxide and carbon dioxide. In one advantage, propylene carbonate has a high boiling point, a high flash point and a low melting point. Another advantage of propylene carbonate is that it imparts a high conductivity and a high salt dissociation.

In one advantage, when compounds of general formula (1) comprising an electrolyte containing propylene carbonate as solvent are used, a comparable reversibility, comparable long-term stability and an equally efficient SEI formation are achieved as with known electrolytes which without the addition of other compounds can form a Solid Electrolyte Interphase. Such a comparable reversibility, comparable long-term stability and efficient SEI formation cannot be achieved with electrolytes containing propylene carbonate but not a compound of general formula (1).

Moreover, because of its higher boiling point and lower melting point, propylene carbonate provide a higher heat stability and thus an increased efficiency over batteries and accumulators containing the usual aprotic electrolytes. Also, the safety risk is reduced because the flammability of electrolytes containing propylene carbonate is lower than that of conventional electrolytes. Moreover, propylene carbonate is easily manageable, because it is liquid at room temperature.

Another preferred aprotic solvent is ethylene carbonate. According to the IUPAC nomenclature, ethylene carbonate is also known as 1,3-dioxolane-2-one. Ethylene carbonate is commercially available. In one advantage, ethylene carbonate has a high boiling point and a high flash point. As a further advantage, ethylene carbonate also imparts a high conductivity and high salt dissociation.

Alternatively, the electrolyte can be a gel polymer electrolyte and/or a hybrid electrolyte. In another preferred embodiment, the solvent is a polymer electrolyte selected, in particular, from the group containing polyethylene oxide, polyacrylonitrile and/or polymethyl methacrylate.

The electrolyte can also be an ionic liquid. In another preferred embodiment, the solvent is an ionic liquid selected from the group consisting of bis(trifluoromethanesulfonyl) imide (EMUI-TFSI), N-butyl-N-methylpyrrolidiniumbis (trifluorobis(trifluoromethanesulfonyl) imide (PYR14-TFSI) and/or N-methyl-N-propylpyrrolidiniumbis(trifluoromethanesulfonyl imide (PYR13TFSI).

The electrolyte of the disclosure contains, besides a solvent and at least one compound of general formula (1), also at least one lithium salt. The lithium salt serves preferably as a conductive salt.

Suitable lithium salts are selected, for example, from the group consisting of $LiAlCl_4$, $LiClO_4$, $LiBF_4$, $LiPF_6$, $LiCl$, $LiGaCl_4$, $LiSCN$, $LiAlO_4$, $LiI$, $LiN(CF_3SO_2)_2$, $LiCF_3CF_2SO_3$, $LiCF_3SO_3$, $LiB(C_6H_5)_4$, $LiC_6H_5SO_3$, $LiCF_3SO_3$, $LiSO_3F$ and/or $LiO_2CCF_3$. Preferred lithium salts are selected from the group consisting of $LiAsF_6$, $LiClO_4$, $LiSbF_6$, $LiPtCl_6$, $Li(CF_3)SO_3$, (LiTf), $LiC(SO_2CF_3)_3$, phosphate-based lithium salts, preferably $LiPF_6$, $LiPF_3(CF_3)_3$ (LiFAP) and $LiPF_4(C_2O_4)$ (LiTFOB), borate-based lithium salts, preferably $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB) and $Li_2B_{12}F_{12}$ (LiDFB),L and lithium salts of sulfonyl imides, preferably $LiN(SO_2CF_3)_2$ (LiTFSI) and $LiN(SO_2C_2F_5)_2$ (LiBETI).

In another preferred embodiment, the lithium salt is selected from the group consisting of $LiPF_6$, $LiBF_4$, $LiAsF_6$, $LiSbF_6$, $LiClO_4$, $LiPtCl_6$, $LiN(SO_2CF_3)_2$ $LiC(SO_2CF_3)_3$ and $LiSO_3CF_3$, lithium borate salts preferably selected from lithium bisoxalatoborate, lithium difluorooxalatoborate, lithium difluoromalonatoborate, lithium difluoroglycolatoborate, lithium difluorosalicylatoborate, lithium difluorolactatoborate and/or lithium difluoropyrocateholoborate, lithium salts of sulfonyl imides, preferably of bis(trifluoromethanesulfonyl) imide and bis(pentafluoroethanesulfonyl) imide, and/or lithium tetrafluoro(oxalate)phosphate. The lithium salt $LiPF_6$ is particularly preferred.

The lithium salt is preferably dissolved in the solvent. Preferably, the concentration of the lithium salt in the electrolyte, preferably in a mixture consisting of the solvent and the compound of formula (1), is in the range of $\geq 0.5$ M to $\leq 2.5$ M, preferably in the range from $\geq 0.65$ to $\leq 2$ M and most preferably in the range from $\geq 1$ M to $\leq 1.5$ M. In one advantage, such a concentration of the lithium salt leads to an electrolyte with good conductivity.

In preferred embodiments, a mixture of the solvent and at least one compound of general formula (1) contains the compound of general formula (1) in the range of ≥0.1 wt. % to ≤15 wt. %, preferably in the range of ≥1.5 wt. % to ≤7 wt. % and preferably in the range of ≥1 wt. % to ≤5 wt. %, relative to the total weight of the mixture, of the least one compound of general formula (1).

In one advantage, an electrolyte containing ≥0.1 wt. % to ≤15 wt. % of a compound of general formula (1), particularly fluoroacetone, can show very good Solid Electrolyte Interphase formation. Moreover, an electrolyte containing ≥0.1 wt. % to ≤15 wt. % of a compound of general formula (1), particularly fluoroacetone, can show high conductivity and good salt dissociation. In a range of ≥1 wt. % to ≤5 wt. %, in particular, very good values for conductivity and salt dissociation are possible.

It may be preferable that in addition to a lithium salt, a solvent, preferably propylene carbonate, and a compound of general formula (1) the electrolyte not contain a further aprotic solvent, particularly no commonly used alkylene carbonate such as ethylene carbonate, dimethyl carbonate or diethyl carbonate.

In a preferred embodiment, the electrolyte contains fluoroacetone, at least one lithium salt, preferably LiPF$_6$, and propylene carbonate as the solvent. The electrolyte can be prepared, for example, by adding the lithium salt to a mixture of the solvent and at least one compound of general formula (1). Alternatively, the lithium salt can first be mixed with the solvent, after which the compound of general formula (1) is added.

It may also be preferred that the electrolyte contain at least one additive, particularly one selected from the group containing SEI formers, flame-proofing agents and overcharge protection additives. The electrolyte preferably contains a compound selected from the group consisting of vinyl carbonate, fluoroethylene carbonate and/or ethylene sulfate.

Suitable SEI formers are selected, for example, from the group containing chloroethylene carbonate, fluoroethylene carbonate, vinylene carbonate (VC), vinylethylene carbonate (VEC), ethylene sulfite (ES), ethylene sulfate, propane sulfonates, sulfites, preferably dimethyl sulfite and propylene sulfite, a sulfate, optionally F-, Cl- or Br-substituted butyrolactones, phenylethylene carbonate, vinyl acetate and/or trifluoropropylene carbonate. Preferred SEI formers are selected from the group containing chloroethylene carbonate, fluoroethylene carbonate, ethylene sulfite (ES), ethylene sulfate, propane sulfonate, sulfites, preferably dimethyl sulfite and propylene sulfite, sulfates, optionally F-, Cl- or Br-substituted butyrolactones, vinyl acetate and trifluoropropylene carbonate, fluoroethylene carbonate and/or ethylene sulfate. Particularly preferred SEI formers are selected from the group consisting of vinyl carbonate, fluoroethylene carbonate and/or ethylene sulfate.

In other embodiments, the mixture of the solvent and at least one compound of general formula (1) contains at least one additive, preferably one compound selected from the group containing vinyl carbonate, fluoroethylene carbonate and/or ethylene sulfate. Preferably, the mixture of the solvent and at least one compound of general formula (1) contains an additive in the range of ≥0.1 wt. % to ≤10 wt. %, preferably in the range of ≥1.5 wt. % to ≤7 wt. % and preferably in the range of ≥1 wt. % to ≤5 wt. %, relative to the total weight of the mixture.

Preferably, the electrolyte contains a total of at least one compound of general formula (1) and other additives, preferably compounds selected from the group consisting of vinyl carbonate, fluoroethylene carbonate and/or ethylene sulfate, overall in the range of ≥0.1 wt. % to ≤15 wt. %, preferably in the range of ≥1.5 wt. % to ≤7 wt. %, preferably in the range of 1 wt. % to ≤5 wt. %, based on the total weight of the mixture of solvent, at least one compound of general formula (1) and an additive.

The electrolyte containing a lithium salt, a solvent and at least one compound of general formula (1) is preferably a liquid composition. A liquid composition can be a solution or a dispersion, for example an emulsion or a suspension. Preferably, the electrolyte is a liquid composition particularly preferably in the form of a solution, particularly an electrolyte solution. If the electrolyte is a liquid composition, preferably a solution, it is preferably virtually water-free, particularly up to at least 99 wt. % water-free, preferably up to at least 99.5 wt. % water-free and particularly at least 99.99 wt. % water-free, especially at least 99.99 wt. % water-free, always based on the total weight of the electrolyte.

Most preferably, the water content of the electrolyte is 30 ppm and preferably 20 ppm at the most.

The electrolyte is particularly well-suited for a battery or an accumulator, particularly as an electrolyte for a lithium ion battery or a lithium ion accumulator. In particular, the electrolyte is well-suited for use in lithium-based energy stores, preferably selected from the group containing lithium batteries, lithium ion batteries, lithium ion accumulators, lithium polymer batteries and or lithium ion condensers. The electrolyte is also suited for use in lithium-based energy stores that are referred to as further developments of lithium ion accumulators, preferably selected from the group consisting of lithium titanate accumulators, lithium air accumulators, lithium manganese accumulators, lithium iron phosphate accumulators, lithium, iron manganese phosphate accumulators, lithium iron yttrium phosphate accumulators, lithium sulfur accumulator, lithium nickel cobalt manganese oxide accumulator, lithium nickel cobalt aluminum oxide accumulator and tin sulfur lithium accumulators.

Another object of the disclosure refers to lithium-based energy stores, particularly a lithium battery, lithium ion battery, lithium ion accumulator, lithium polymer battery or lithium ion condenser containing an electrolyte of the disclosure.

The lithium-based energy stores are suited for all application fields, particularly for electric vehicles including electric hybrid vehicles such as automobiles, scooters or bicycles, electric tools, for example electric drills, or buffer accumulators for an uninterrupted power supply.

A further object of the disclosure relates to a vehicle or device with at least one lithium-based energy store with an electrolyte of the disclosure.

Another object of the disclosure concerns the use of the following compound of general formula (1)

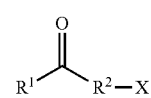

(1)

wherein
X is selected from the group consisting of F, Cl, Br and/or I;
$R^1$ is hydrogen or a $C_{1-6}$-aliphatic, unsubstituted or simply or multiply substituted with at least one substituent selected from the group consisting of F, Cl, Br, I, $C_{1-4}$-alkyl, carbonyl oxygen, and/or $C_{1-4}$-alkoxy;

$R^2$ is a $C_{1-6}$ aliphatic optionally simply or multiply substituted with at least one substituent selected from the group consisting of F, Cl, Br, I, $C_{1-4}$-alkyl, carbonyl oxygen, and/or $C_{1-4}$-alkoxy;

where $R^1$ and $R^2X$ are not simultaneously $CF_3$; or $R^1$ and $R^2$ together form a saturated 5- or 6-membered ring which can be simply or multiply substituted with at least one substituent selected from the group consisting of F, Cl, Br, I, $C_{1-4}$-alkyl, carbonyl oxygen, and/or $C_{1-4}$-alkoxy, in electrolytes for primary and secondary electrochemical lithium-based energy stores, preferably selected from the group consisting of lithium batteries, lithium ion batteries, lithium ion accumulators, lithium polymer batteries and/or lithium ions condensers, particularly in a lithium ion battery or in a lithium ion accumulator.

Preferred is the use of a compound of general formula (2), as indicated in the foregoing.

In preferred embodiments is used a compound of general formula (1) wherein:

X is selected from the group consisting of F, Cl, Br and/or I;

$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and/or $C_2HF_4$ and preferably from the group consisting of $CH_3$, $CH_2F$, $CHF_2$ and/or $CF_3$;

$R^2$ is a —$CR^3R^4$— group wherein $R^3$ is selected from the group consisting of H, $CH_3$, $CH_2F$, $CHF_2$ and/or $CF_3$, and $R^4$ is selected from the group consisting of H, F, $CH_3$, $CH_2F$ and/or $CHF_2$; or $R^1$ and $R^3$ together form a saturated 5- or 6-membered ring with $R^4$ being hydrogen.

In preferred embodiments, in a non-cyclic compound:

X is selected from the group consisting of F, Cl, Br and/or I;

$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and/or $C_2HF_4$ and preferably from the group consisting of $CH_3$, $CH_2F$, $CHF_2$ and/or $CF_3$;

$R^2$ a —$CR^3R^4$— group wherein $R^3$ is selected from the group consisting of H, $CH_3$, $CH_2F$, $CHF_2$, and/or $CF_3$, and $R^4$ is selected from the group consisting of H, F, $CH_3$, $CH_2F$ and/or $CHF_2$.

In preferred embodiments, in a cyclic compound of general formula (1), X is selected from the group consisting of F, Cl, Br and/or I, and $R^1$ and $R^2$ together form a saturated 5- or 6-membered ring. Referring to general formula (2) wherein $R^2$ is formed by a —$CR^3R^4$— group, $R^1$ and $R^3$ together correspondingly form the saturated 5- or 6-membered ring where $R^4$ is hydrogen. Preferably, a ring formed by $R^1$ and $R^2$ or by $R^1$ and $R^3$ contains no substituents beyond X.

X is preferably fluorine. $R^1$ is preferably selected from the group consisting of $CH_3$, $CH_2F$, $CHF_2$, $CF_3$, $C_2H_5$, $C_2H_4F$, $C_2H_3F_2$, $C_2H_2F_3$ and/or $C_2HF_4$. Preferably, $R^1$ is selected from the group consisting of $C_2H_5$, $C_2H_4F$, $C_2H_3F_2$, $C_2H_2F_3$ and/or $C_2HF_4$. Most preferably, $R^1$ is selected from the group consisting of $CH_3$, $CH_2F$, $CHF_2$ and/or $CF_3$, and preferably from the group consisting of $CH_3$, $CH_2F$ and/or $CHF_2$.

Preferably, no perhalogenated or perfluorinated compounds are used. When $R^1$ and $R^3$ are $CF_3$ and $R^4$ therefore is preferably not fluorine, or when $R^3$ is $CF_3$ and $R^4$ is fluorine, $R^1$ is correspondingly preferably not $CF_3$. Preferably, $R^3$ is selected from the group consisting of H, $CH_3$, $CH_2F$ and/or $CHF_2$.

In preferred embodiments, a compound of general formula (1) is used wherein:

X is F;

$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and/or $C_2HF_4$ and preferably from the group consisting of $CH_3$, $CH_2F$, $CHF_2$ and/or $CF_3$;

$R^2$ is a —$CR^3R^4$— group wherein $R^3$ is hydrogen and $R^4$ is selected from the group consisting of H, F, $CH_3$, $CH_2F$ and/or $CHF_2$.

Preferably, $R^1$ is selected from the group consisting of $CH_3$, $CH_2F$, $CHF_2$, $CF_3$, $C_2H_5$, $C_2H_4F$, $C_2H_3F_2$, $C_2H_2F_3$ and/or $C_2HF_4$. $R^1$ is preferably selected from the group consisting of $C_2H_5$, $C_2H_4F$, $C_2H_3F_2$, $C_2H_2F_3$ and/or $C_2HF_4$. Particularly preferably, $R^1$ is selected from the group consisting of $CH_3$, $CH_2F$, $CHF_2$ and/or $CF_3$, preferably from the group consisting of $CH_3$, $CH_2F$ and/or $CHF_2$.

In preferred embodiments, the compound of general formula (1) used is selected from the group consisting of $CF_3$—C(O)—$CHF_2$, $CF_3$—C(O)—$CH_2F$, $CHF_2$—C(O)—$CHF_2$, $CF_3$—C(O)—$CH_3$, $CH_2F$—C(O)—$CHF_2$, $CHF_2$—C(O)—$CH_3$, $CH_2F$—C(O)—$CHF_2$ and/or $CH_2F$—C(O)—$CH_3$. Preferably, the compound of general formula (1) or (2) is selected from $CH_2F$—C(O)—$CH_2F$ and/or $CH_2F$—C(O)—$CH_3$. Particularly preferred is the compound of general formula (1) $CH_3$—C(O)—$CH_2F$, known as fluoro-2-propanone or fluoroacetone.

Another object of the disclosure concerns the use of an electrolyte of the disclosure in primary and secondary electrochemical lithium-based energy stores, preferably selected from the group consisting of lithium batteries, lithium ion batteries, lithium ion accumulators, lithium polymer batteries and/or lithium ion condensers, particularly in a lithium ion battery or in a lithium ion accumulator.

BRIEF DESCRIPTION OF THE DRAWINGS

Examples and figures illustrating the present disclosure are given in the following.

The figures show the following.

DETAILED DESCRIPTION

Example 1

Figure 1:
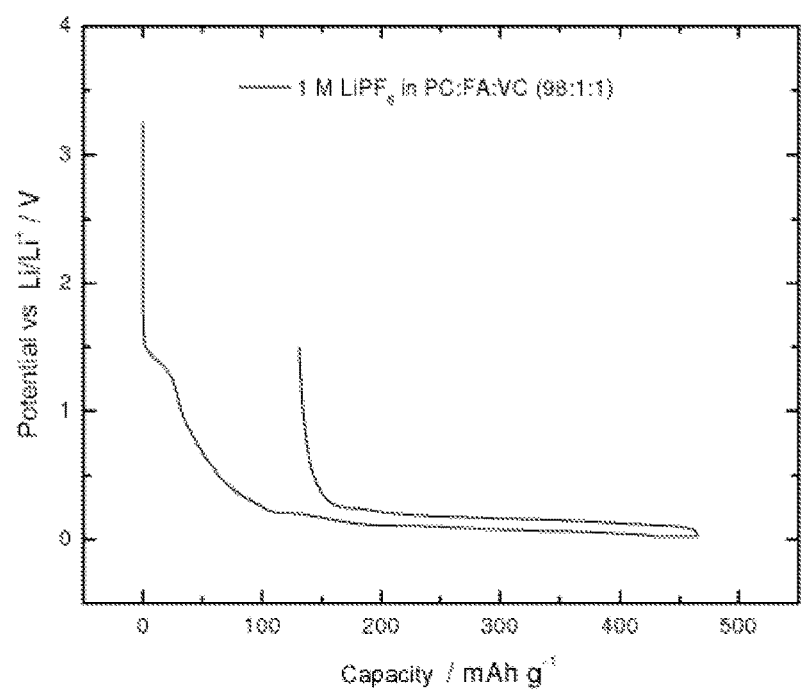
FIG. 1 shows the first cycle of a graphite anode when 1 M $LiPF_6$ is used in the electrolyte solution B2 of the disclosure containing propylene carbonate (PC), 1 wt. % of fluoroacetone (FA) and 1 wt. % of vinyl carbonate (VC). The potential is plotted against the specific capacity.

Determination of Conductivity
Electrolyte Solutions Used:
Electrolyte A1 of the Disclosure:

A mixture of 95 wt. % of propylene carbonate (UBE, battery grade) and 5 wt % of fluoroacetone (ABCR, 99% was used. In this mixture was dissolved 287 g/L of LiN(SO$_2$CF$_3$)$_2$ (LiTFSI) (3M, battery grade) so that a 1 M concentration of the lithium salt was obtained.
Electrolyte Solution B1 of the Disclosure A mixture of 98 wt. % of propylene carbonate (UBE, battery grade), 1 wt. % of fluoroacetone (ABCR, 99%) and 1 wt % of vinyl carbonate (UBE, battery grade) was used. In this mixture was dissolved 287 g/L of LiN(SO$_2$CF$_3$)$_2$ (LiTFSI) (3M, battery grade) so that a 1 M concentration of the lithium salt was obtained.
Comparative Electrolyte V1

A mixture of 95 wt. % propylene carbonate (UBE, battery grade) and 5 wt. % of vinyl carbonate (UBE, battery grade) was used. In this mixture was dissolved 287 g/L of LiN(SO$_2$CF$_3$)$_2$ (LiTFSI) (3M, battery grade) so that a 1 M concentration of the lithium salt was obtained.
Electrolyte A2 of the Disclosure A mixture of 95 wt. % propylene carbonate (UBE, battery grade) and 5 wt. % of fluoroacetone (ABCR, 99%) was used. In this mixture was dissolved 152 g/L of LiPF$_6$ (Sigma, 99.995%) so that a 1 M concentration of the lithium salt was obtained.
Electrolyte B2 of the Disclosure A mixture of 98 wt. % propylene carbonate (UBE, battery grade), 1 wt. % of fluoroacetone (ABCR, 99%) and 1 wt. % of vinyl carbonate (UBE, battery grade) was used. In this mixture was dissolved 152 g/L of LiPF$_6$ (Sigma, 99.995%) so that a 1 M concentration of the lithium salt was obtained.
Comparative Electrolyte V2

A mixture of 95 wt. % of propylene carbonate (UBE, battery grade) and 5 wt. % of vinyl carbonate (UBE, battery grade) was used. In this mixture was dissolved 152 g/L of LiPF$_6$ (Sigma, 99.995%) so that a 1 M concentration of the lithium salt was obtained.

The conductivity of the electrolyte of the disclosure and of the comparative electrolyte was determined by use of a conductivity-measuring cell we ourselves developed. It consisted of a basic polypropylene body into which were worked in two electrodes of high-quality alloy steel, having a diameter of 4 mm. The cell constant was determined with the aid of a standard KCl solution. The measurements were carried out in an oven (Binder) heated at 25° C. 1 M LiN(SO$_2$CF$_3$)$_2$ (LiTFSI) was used as the conductive salt.

The conductivity of the propylene carbonate solvent with 1 M LITFSI was found to be 4.8 mS/cm. The conductivity of the electrolyte A1 of the disclosure containing 5 wt. % of fluoroacetone and of B1 containing 1 wt. % of fluoroacetone and 1 wt. % of vinyl carbonate was 4.9 mS/cm and that of the comparative electrolyte V1 was 5.0 mS/cm.

The conductivity of the propylene carbonate solvent with 1 M LiPF$_6$ was found to be 6.0 mS/cm. The conductivity of the electrolyte A2 of the disclosure containing 5 wt. % of fluoroacetone was 6.6 mS/cm. The conductivity of the electrolyte B2 containing 1 wt. % of fluoroacetone and 1 wt. % of vinyl carbonate was 6.0 mS/cm and that of the comparative electrolyte V2 was 6.3 mS/cm.

This shows that the electrolytes of the disclosure have very good conductivity at 25° C. Moreover, the addition of fluoroacetone results in a slight increase in conductivity compared to the pure solvent.

Example 2

Determination of the Capacity
Electrolyte Solutions Used:
Electrolyte A2 of the Disclosure A mixture of 95 wt. % of propylene carbonate (UBE, battery grade) and 5 wt. % of fluoroacetone (ABCR, 99%) was used. In this mixture was dissolved 152 g/L of LiPF$_6$ (Sigma, 99.995%) so that a 1 M concentration of the lithium salt was obtained.
Electrolyte B2 of the Disclosure A mixture of 98 wt. % of propylene carbonate (UBE, battery grade), 1 wt. % of fluoroacetone (ABCR, 99%) and 1 wt. % of vinyl carbonate (UBE, battery grade) was used. In this mixture was dissolved 152 g/L of LiPF$_6$ (Sigma, 99.995%) so that a 1 M concentration of the lithium salt was obtained.
Comparative Electrolyte V2

A mixture of 95 wt. % of propylene carbonate (UBE, battery grade) and 5 wt. % of vinyl carbonate (UBE, battery grade) was used. In this mixture was dissolved 152 g/L of LiPF$_6$ (Sigma, 99.995%) so that a 1 M concentration of the lithium salt was obtained.

Cells were prepared with the electrolyte solutions A2 and B2 of the disclosure and the comparative electrolyte V2 in a 3-electrode device in which the negative electrode was a graphite electrode and the positive electrode was a lithium-nickel-cobalt-manganese oxide (NCM) electrode. The reference electrode was made of metallic lithium. Since the irreversible capacity loss is affected not only by the electrolytes used but also by the graphite anode, the electrodes were made from the same batch so that the effect of the anode could be neglected.

To determine the extent of the capacity of a battery after a discharge compared to the initial capacity, the first charging and the first discharging process were studied between 0.025 V and 1.5 V at a C-rate of 0.2 C. The initial charging and discharging of a cell is also indicated as formation or as first cycle.

The irreversible capacity loss of comparative electrolyte V2 amounted to 495 mAh g$^{-1}$ and the resulting efficiency amounted to only 33.6% of the initial capacity. On the other hand, the irreversible capacity loss of the electrolytes A2 of the disclosure containing 5 wt. % of fluoroacetone amounted to 161 mAh g$^{-1}$ and the efficiency amounted to 53% of the initial capacity. When the electrolytes B2 of the disclosure containing 1 wt. % of fluoroacetone and 1 wt. % of vinyl carbonate were used, the irreversible capacity loss amounted to 117 mAh g$^{-1}$ and the efficiency was still 75.5% of the initial capacity, as shown in FIG. 1.

We were able to establish that the use of 5 wt. % of fluoroacetone in the electrolytes A2 of the disclosure clearly improved also the efficiency of the first cycle, i.e., that the irreversible capacity loss is clearly reduced. A further improvement was achieved by use of the electrolytes B2 of the disclosure containing 1 wt. % of fluoroacetone and 1 wt. % of vinyl carbonate.

Example 3

Study of Cyclizations

The capacity loss over the number of cycles was investigated. The same cells were used with the electrolyte solutions A2 and B2 of the disclosure and with the comparative electrolyte V2 as in Example 2.

At first, the cells were formed over three cycles at a C-rate of 0.2 C between 0.025 V and 1.5 V. From the first cycle of this formation, the irreversible capacity (as described in Example 2) and the efficiency were determined. Then, all cells were cyclized at a C rate of 1 C between 0.025 V and 1.5 V. In each cycle, the discharge step was followed by a "constant voltage" step at which the potential was kept at 0.025 V for one hour. The cell was then recharged. These three steps were carried out 150 times for the comparative electrolyte V2 and 200 times for each of the electrolytes A2 and B2. These tests were carried out at room temperature (20° C.) on a cell test station of the Maccor Company.

We were able to determine that in use of the comparative electrolyte V2 after 100 cycles 96% of the initial capacity and after 150 cycles 93.6% of the initial capacity was still present. In use of the electrolytes A2 of the disclosure and 94% of the capacity after 100 cycles, and after 150 cycles, 91% was still present, while during the use of the electrolyte B2 of the disclosure after 100 cycles, 98.8% and after 200 cycles, 98.3% of the capacity was still present. The use of fluoroacetone and vinyl carbonate in particular brought about a definite improvement.

Example 4

Cyclic Voltammetry

The cyclic voltammetries were determined with a half-cell (3 electrode cells, Swagelok®-foundation) at room temperature (20° C.) by use of a potentiostat of the BioLogic Company (VSP type). To this end, graphite electrodes were used (all from the same batch) as working electrodes (T44, Timcal) and lithium as counter- and reference electrodes (Chemetall, battery grade). The electrolyte solutions A2 and B2 of the disclosure and the comparative electrolyte V2 were used as described in Example 2. The starting potential was reduced potential-dynamically down to 0.025 V, and from this value, the potential was increased to 1.5 V. This process was repeated three times (cyclically).

In the reduction of the potential, we found above a potential of about 0.25 V an intercalation of the lithium into the graphite layers. When this process takes place in standard electrolytes such as ethylene carbonate/diethyl carbonate, then several intercalation steps can be seen in the cyclic voltammogram. If, on the other hand, one reduces the potential of cells in which propylene carbonate was used as the electrolyte without additives, then the propylene carbonate is cointercalated into the graphite layers and destroys the graphite irreversibly.

Figure 2:
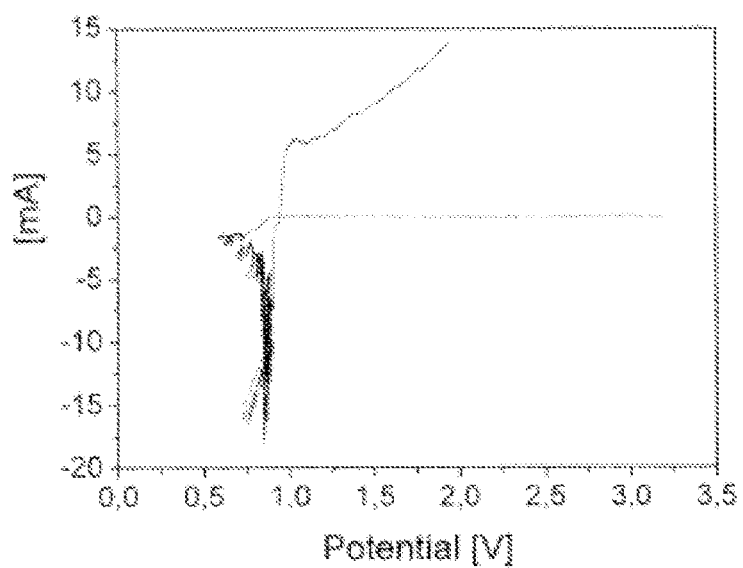
FIG. 2 shows the voltammogram for the use of 1 M $LiPF_6$ in propylene carbonate as the electrolyte. The current intensity is plotted against the potential.

As shown in FIG. 2, when propylene carbonate was used, no cyclic voltammogram could be plotted. This is explained by the fact that the graphite-typical layer structure was completely destroyed already at the first intercalation.

On the other hand, electrolyte solutions A2 and B2 of the disclosure received besides the propylene carbonate also 5 wt. % of fluoroacetone or 1 wt. % of fluoroacetone and 1 wt. % of vinyl carbonate. As shown in FIG. 2, the use of fluoroacetone prevented a cointercalation of the propylene carbonate so that a cyclic voltammetry could be carried out.

Figure 3:
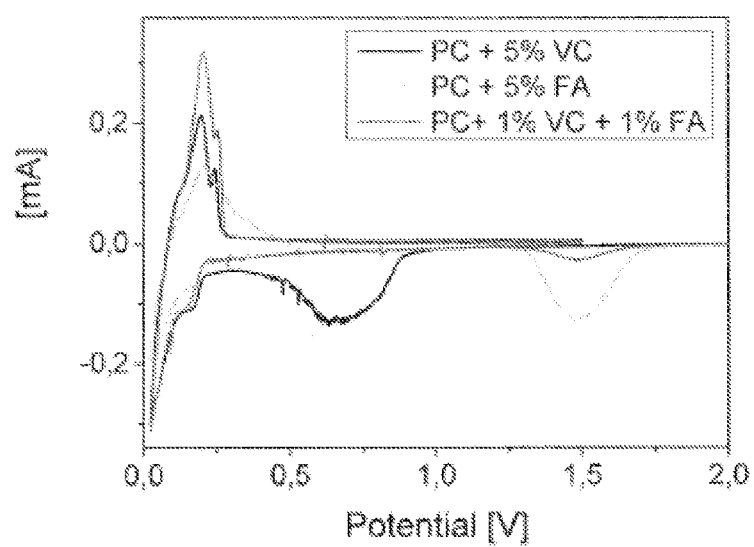
FIG. 3 shows a cyclic voltammogram for the use of 1 M $LiPF_6$ in the electrolyte solutions A2 of the disclosure containing propylene carbonate (PC) and 5 wt. % of fluoroacetone (FA) and B2 containing propylene carbonate (PC) 1 wt. % of fluoroacetone (FA) and 1 wt. % of vinyl carbonate (VC) and the comparison electrolyte V2 containing propylene carbonate (PC) and 5 wt. % of vinyl carbonate (VC). The current intensity is plotted against the potential.

In the cyclic voltammogram presented in FIG. 3, besides the various intercalation steps of the graphite, the decomposition potential of fluoroacetone and vinyl carbonate can be recognized. Thus, vinyl carbonate decomposed above a potential of 1 V and reached its peak around 0.65 V. The decomposition of fluoroacetone started already at a potential of 1.8 V and reached its peak at 1.48 V.

If we consider the decomposition of the mixture of propylene carbonate with 1 wt. % of fluoroacetone and 1 wt. % of vinyl carbonate of the electrolyte solution B2 of the disclosure, it is conspicuous that the decomposition began somewhat later at 1.7 V but that the peak was also attained at 1.48 V. It was established that for a mixture of 1 wt. % of vinyl carbonate (VC) and 1 wt. % of fluoroacetone (FA), no peak for the vinyl carbonate could be seen. From this, it may be concluded that the decomposition of vinyl carbonate took place at the same time as the decomposition of fluoroacetone. Without being based on any particular theory, it is assumed that the decomposition of fluoroacetone induced the simultaneous decomposition reaction of vinyl carbonate. It can be seen, in particular, that the decomposition of vinyl carbonate took place exclusively in the first cycle.

We were able to establish that fluoroacetone and vinyl carbonate can form a stable SEI which can protect the graphite from exfoliation during the entire cyclization time. It may be particularly advantageous that if the decomposition clearly takes place before the intercalation potential, a stable SEI can be formed before the lithium is intercalated. The two processes thus do not influence each other.

The early decomposition of fluoroacetone and thus the related SEI formation may thus show a definite advantage over the use of vinyl carbonate.

Example 5

Determination of the Capacity and Cyclization of 1,3-Difluoroacetone

The determination of the irreversible capacity in the first cycle and of the loss of capacity over the cycle number for 1,3-difluoroacetone took place as described in Examples 2 and 3 when the following electrolytes of the disclosure were used:

Electrolyte C1: A 1 M solution of $LiFP_6$ in a mixture of 98 wt. % of propylene carbonate (PC) and 1 wt. % each of 1,3-difluoroacetone (DFA) and vinyl carbonate (VC).

Electrolyte C2: A 1 M solution of $LiFP_6$ in a mixture of 99 wt. % of propylene carbonate (PC) and 0.5% each of 1,3-difluoroacetone and vinyl carbonate.

Electrolyte C3: A 1 M solution of $LiFP_6$ in a mixture of 95 wt. % of propylene carbonate and 5 wt. % of 1,3-difluoroacetone.

To this end, we used a mixture of propylene carbonate (UBE, battery grade), 1,3-difluoroacetone (ABCR, 99%) and possibly vinyl carbonate (UBE, battery grade). In this mixture was dissolved 152 g/L of $LiFP_6$ (Sigma, 99.995%) so that a 1 M concentration of the lithium salt was obtained. We performed 500 charging/discharging cycles.

Figure 4:
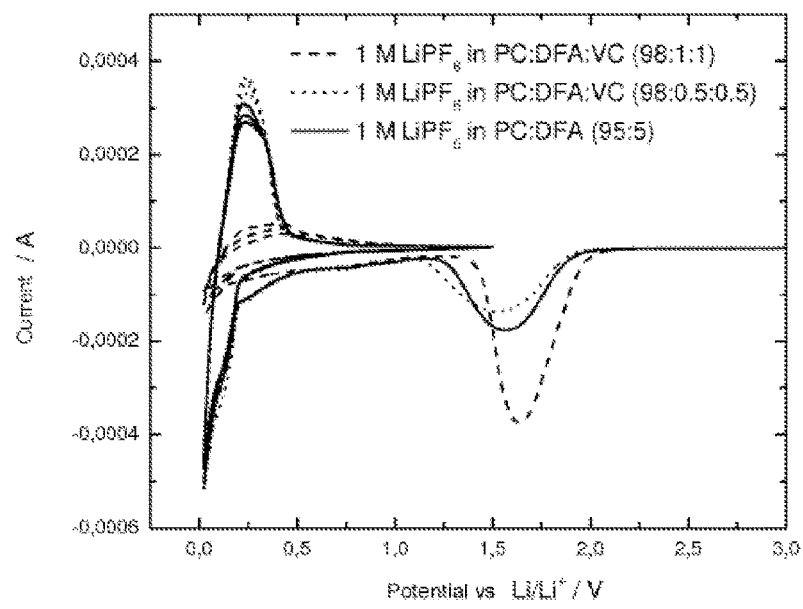
FIG. 4 shows a cyclic voltammogram for the use of 1 M $LiPF_6$ in the electrolyte solutions C1 of the disclosure containing propylene carbonate (PC), 1 wt. % of 1,3-difluoroacetone (DFA) and 1 wt. % of vinyl carbonate (VC), C2 containing propylene carbonate (PC), 1 wt. % of 1,3-difluoroacetone (DFA) and 1 wt. % of vinyl carbonate and C3 containing propylene carbonate (PC) and 5 wt. % of 1,3-difluoroacetone (DFA). The current intensity is plotted against the potential.

As shown in FIG. 4, by the use of 1,3-difluoroacetone in electrolyte solutions C1, C2 and C3 of the disclosure, a cointercalation of the propylene carbonate can be prevented and a cyclic voltammetry can be carried out. By contrast, when propylene carbonate is used, no cyclic voltammogram can be prepared. This can be explained on the basis that the graphite-typical layer structure had already been destroyed during the first intercalation.

In the cyclic voltammogram of FIG. 4, one can see besides the intercalation of lithium into the graphite also the decomposition potential of 1,3-difluoroacetone. The decomposition of 1,3-difluoroacetone started already at a potential of 2 V and for the electrolytes of the disclosure C1 containing 0.5 wt. % of 1,3-difluoroacetone reached a peak at 1.63 V. The decomposition of the mixture of propylene carbonate and 1 wt. % of 1,3-difluoroacetone and 1 wt. % of vinyl carbonate of the electrolyte solution C1 of the disclosure reached its peak at 1.57 V. Furthermore, we found that for a mixture of 1 wt. % of vinyl carbonate (VC) and 1 wt. % of 1,3-difluoroacetone, there was no peak for the vinyl carbonate, as can be seen in FIG. 4. This indicates that the decomposition of vinyl carbonate took place at the same time as that of 1,3-difluoroacetone. A similar situation was found for the electrolyte C2 of the disclosure. With a smaller amount of 0.5 wt. % of 1,3-difluoroacetone and 0.5 wt. % of vinyl carbonate, the decomposition peak appeared at 1.52 V thus having been further displaced to a lower potential. For the electrolytes C1, C2 and C3 of the disclosure, the decomposition started at nearly the same potentials.

Without being based on any particular theory, it is assumed that the decomposition of 1,3-difluoroacetone like that of fluoroacetone induced the simultaneous decomposition reaction of vinyl carbonate. In particular, it can be seen that the decomposition of vinyl carbonate took place exclusively in the first cycle.

We further investigated the first charging and first discharging process between 0.025 V and 1.5 V at a rate of 0.2 C of a battery to determine the level of capacity after discharge for comparison with the initial capacity.

Figure 5:
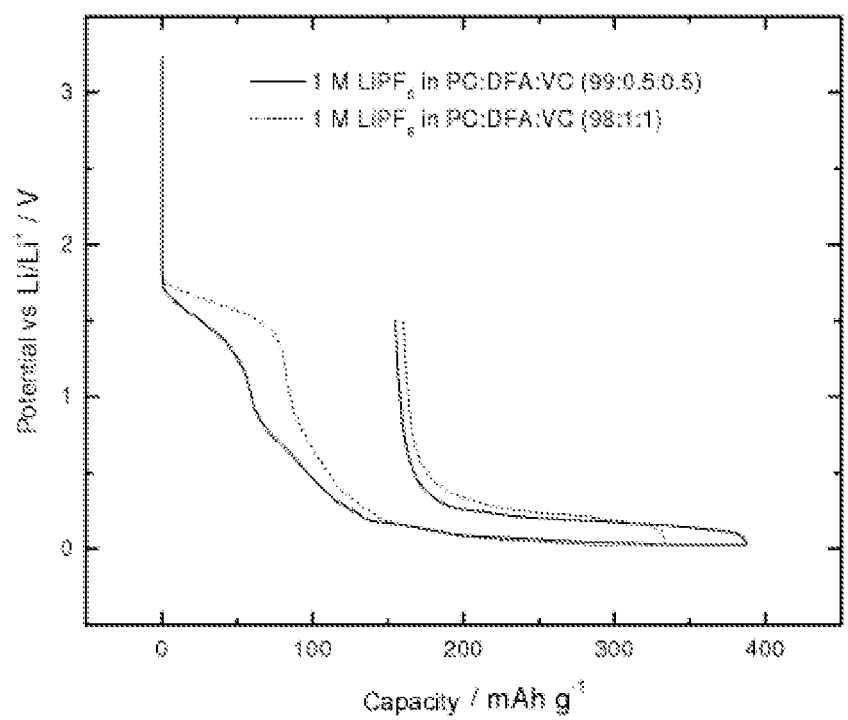
FIG. 5 shows the first cycle of a graphite anode when 1 M LiPF$_6$ is used in the electrolyte solutions C1 of the disclosure containing propylene carbonate (PC), 1 wt. % of 1,3-difluoroacetone and 1 wt. % of vinyl carbonate (VC), C2 containing propylene carbonate (PC) and 0.5 wt. % of 1,3-difluoroacetone (DFA) and 0.5 wt. % of vinyl carbonate (VC). The current intensity is plotted against the capacity.

As shown in FIG. 5, the irreversible capacity loss of the electrolyte C1 of the disclosure at 160 mAh g$^{-1}$ and the resulting efficiency appeared at 52% of the initial capacity. The irreversible capacity loss of the electrolyte C2 of the disclosure containing 0.5 wt. % of fluoroacetone and 0.5 wt. % of vinyl carbonate appeared at 155 mAh g$^{-1}$ and the efficiency still amounted to 60% of the initial capacity. The irreversible capacity loss of the comparative electrolyte V2, on the other hand, amounted to 495 mAh g$^{-1}$ and the resulting efficiency was only 33.6% of the initial capacity.

We were thus able to establish that, in this embodiment, the use of 0.5 wt. % of 1,3-difluoroacetone and 0.5 wt. % of vinyl carbonate or of 1 wt. % of 1,3-difluoroacetone and 1 wt. % of vinyl carbonate clearly improved the efficiency of the first cycle, and that the irreversible capacity loss was clearly reduced.

Overall, we were able to establish that 1,3-difluoroacetone and vinyl carbonate can create a stable SEI capable of protecting the graphite from exfoliation over the entire cyclization time. It may be of particular advantage that when the decomposition takes place clearly before the intercalation potential, a stable SEI can be formed before the lithium is intercalated. The two processes thus do not influence each other.

The early decomposition of fluoroacetone and the accompanying creation of the SEI thus, in this embodiment, show a definite advantage over the use of vinyl carbonate.

The invention claimed is:

1. An electrolyte containing at least one lithium salt, one solvent that is an aprotic solvent, an ionic liquid and/or a polymer electrolyte, and a compound of the following general formula (1)

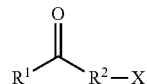

wherein:
X is selected from the group consisting of F, Cl, Br and I;
$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and $C_2HF_4$; and
$R^2$ is a —$CR^3R^4$— group wherein:
$R^3$ is selected from the group consisting of H, $CH_3$, $CH_2F$, $CHF_2$ and $CF_3$, and
$R^4$ is selected from the group consisting of H, F, $CH_3$, $CH_2F$ and $CHF_2$.

2. The electrolyte according to claim 1 characterized in that:
X is F;
$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and $C_2HF_4$;
$R^2$ is a —$CR^3R^4$— group wherein:
$R^3$ is hydrogen, and
$R^4$ is selected from the group consisting of H, F, $CH_3$, $CH_2F$ and $CHF_2$.

3. The electrolyte according to claim 1 characterized in that the compound of general formula (1) is selected from the group consisting of $CF_3$—C(O)—$CHF_2$, $CF_3$—C(O)—$CH_2F$, $CHF_2$—C(O)—$CHF_2$, $CH_2F$—C(O)—$CHF_2$, $CHF_2$—C(O)—$CH_3$, $CH_2F$—C(O)—$CH_2F$ and $CH_2F$—C(O)—$CH_3$.

4. The electrolyte according to claim 1, characterized in that a mixture of the solvent and of the compound of general formula (1) contains the compound of general formula (1) in the range of ≥0.1 wt. % to ≤15 wt. %, based on the total weight of the mixture.

5. The electrolyte according to claim 1, characterized in that the lithium salt is selected from the group consisting of $LiPF_6$, $LiBF_4$, $LiAsF_6$, $LiSbF_6$, $LiClO_4$, $LiPtCl_6$, $LiN(SO_2CF_3)_2$, $LiC(SO_2CF_3)_3$ and $LiSO_3CF_3$, lithium borate salts, lithium salts of sulfonyl imides, and lithium tetrafluoro(oxalate)phosphate.

6. Lithium-based energy stores containing an electrolyte according to claim 1.

7. A method of running a primary or secondary electrochemical lithium-based energy store, the method comprising the step of providing an electrolyte comprising at least one lithium salt, one solvent that is an aprotic solvent, an ionic liquid and/or a polymer electrolyte, and a compound of general formula (1) shown hereinbelow

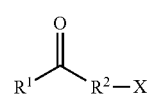

wherein:
X is selected from the group consisting of F, Cl, Br and I;
$R^1$ is selected from the group consisting of H, $CH_3$, $CH_2F$, $CHF_2$, $CF_3$, $C_2H_5$, $C_2H_4F$, $C_2H_3F_2$, $C_2H_2F_3$ and $C_2HF_4$; and $R^2$ is a —$CR^3R^4$— group wherein:
- $R^3$ is selected from the group consisting of H, $CH_3$, $CH_2F$, $CHF_2$ and $CF_3$, and
- $R^4$ is selected from the group consisting of H, F, $CH_3$, $CH_2F$ and $CHF_2$.

8. The electrolyte according to claim 1, wherein $R^1$ is selected from the group consisting of $CH_3$, $CH_2F$, $CHF_2$ and $CF_3$.

9. The electrolyte according to claim 1, wherein the aprotic solvent is selected from the group consisting of propylene carbonate, ethylene carbonate, diethyl carbonate, dimethyl carbonate, ethyl methyl carbonate, acetonitrile, glutaronitrile, adiponitrile, pimelonitrile, gamma-butyrolactone and gamma-valerolactone.

10. The electrolyte according to claim 1, wherein the ionic liquid is selected from the group consisting of bis(trifluoromethylsulfonyl)imide, N-butyl-N-methylpyrrolidinium bis(trifluoromethylsulfonyl)imide and N-methyl-N-propylpyrrolidinium bis(trifluoromethylsulfonyl)imide.

11. The electrolyte according to claim 1, wherein the polymer electrolyte is selected from the group consisting of polyethyleneoxide, polyacrylonitrile and polymethylmethacrylate.

12. The electrolyte according to claim 4, wherein the mixture of the solvent and of the compound of general formula (1) contains the compound of general formula (1) in the range of ≥1.5 wt. % to ≤7 wt. % based on the total weight of the mixture.

13. The electrolyte according to claim 4, wherein the mixture of the solvent and of the compound of general formula (1) contains the compound of general formula (1) in the range of ≥1 wt. % to ≤5 wt. % based on the total weight of the mixture.

14. The electrolyte according to claim 5, wherein the lithium borate salts are selected from the group consisting of lithium bisoxalatoborate, lithium difluorooxalatoborate, lithium difluoromalonatoborate, lithium difluoroglycolatoborate, lithium difluorosalicylatoborate, lithium difluorolactatoborate and lithium difluoropyrocatecholoborate.

15. The electrolyte according to claim 5, wherein the sulfonyl imide is selected from the group consisting of bis(trifluoromethanesulfonyl)imide and bis(pentafluoroethanesulfonyl)imide.

16. The lithium-based energy stores of claim 6, wherein the lithium-based energy stores are selected from the group consisting of lithium batteries, lithium ion batteries, lithium ion accumulators, lithium polymer batteries and/or lithium ion condensers.

17. The method of claim 7, wherein the primary or secondary electrochemical lithium-based energy store is selected from the group consisting of a lithium battery, a lithium ion battery, a lithium ion accumulator, a lithium polymer battery and a lithium ion condenser.

18. The method of claim 7, wherein $R^1$ is selected from the group consisting of $CH_3$, $CH_2F$, $CHF_2$ and $CF_3$.

* * * * *